Patented July 22, 1952

2,604,461

UNITED STATES PATENT OFFICE 2,604,461

PRODUCTION OF SULFONATED ALKENYL AROMATIC RESINS

Harold H. Roth, Bay City, Mich., assignor to The Dow Chemical Company, Midland, Mich., a corporation of Delaware No Drawing. Application July 22, 1950, Serial No. 175,471

16 Claims. (Cl. 260—79.3)

This invention concerns an improved method for the sulphonation of solid alkenyl aromatic resins and for separation of the sulphonated resins from the reaction mixture. It also pertains to a combination of steps and reaction conditions whereby the sulphonated resins may be obtained in substantially white, or nearly colorless, condition. It pertains more particularly to a method whereby the sulphonation may be accomplished conveniently and economically in a continuous manner with sulphonation of the resin throughout the body of the latter. It has special reference to certain novel steps for separation of the sulphonated resins from the reaction mixtures; particularly for removal of sulphuric acid from the sulphonated resins and more particularly for accomplishing such removal to recover a considerable amount of unconsumed sulphuric acid in a condition of fairly high concentration.

It is known that polystyrene and other solid, resinous polymers and copolymers of alkenyl aromatic compounds may be sulphonated by treatment at elevated temperatures with usual sulphonating agents such as concentrated sulphuric acid, fuming sulphuric acid, sulphur trioxide, or chlorosulphonic acid, etc., and that the sulphonated resins are soluble, or swellable, with water, depending in part on the extent and uniformity of the sulphonation reaction. The sulphonated resins and their alkali metal salts are useful as emulsifying agents, wetting agents, and thickening agents. They may be employed as sizing or dressing agents in the tanning of leather and as auxiliary agents in the textile industry. For such purposes it is important that the resins be sulphonated throughout, i. e. that the sulphonated resins be free of the unsulphonated resin, since the latter is neither soluble nor swellable with water. It is also desirable that the sulphonated resins be free from discoloration.

Polystyrene and other alkenyl aromatic resins, although readily sulphonated to a limited degree at the surface of granules or other bodies of the polymers, are not readily or rapidly sulphonated throughout to obtain uniformly sulphonated products suitable for the above-mentioned purposes. Certain of the known sulphonation procedures accomplish mere surface sulphonation to form a non-uniform and only partially sulphonated resin which is not adapted to such purposes. The known methods for sulphonating the resins throughout to obtain products of satisfactory uniformity are time-consuming and inconvenient, or involve employment of vigorous sulphonating conditions which result in objectionable darkening of the sulphonated material. They also involve neutralization or water-washing steps for isolation of the sulphonated resin products, which steps destroy or dilute greatly the unconsumed sulphuric acid.

The invention provides a method whereby the alkenyl aromatic resins may conveniently and economically be sulphonated throughout, either batchwise or in continuous manner, and the sulphonated resin products be separated from the reaction mixtures. It also provides steps and conditions whereby the sulphonated resins may be produced in colorless, i. e. white, or nearly colorless condition. It further provides certain new steps whereby unconsumed sulphuric acid may be removed from the sulphonated resins and a considerable portion of the sulphuric acid may be recovered in a form of fairly high, e. g. greater than 40 weight percent, concentration, thus warranting further use of the recovered acid for other purposes. The sulphuric acid removal steps which are provided by the invention not only avoid loss of sulphuric acid, but also avoid loss of the considerable amount of alkali heretofore consumed in neutralizing the acid and/or avoid the need for evaporating large amounts of water which is involved in the conventional steps of washing acid from a sulphonated resin with water and thereafter drying the product.

I have found that sulphonation of polystyrene and other alkenyl aromatic resins occurs readily and under mild sulphonating conditions to a depth of approximately 0.025 inch from the resin surface, but more slowly and difficultly at greater depths, and that by employing the vinyl aromatic resins in the form of films of thickness not greater than 0.05 inch, the resins may readily and rapidly be sulphonated throughout under mild sulphonation conditions which do not cause extensive and irremovable discoloration of the sulphonated resin product. When a permanently discolored product is not objectionable, the resin films may, of course, be sulphonated under more vigorous conditions, but mild sulphonating conditions which result in a substantially white product are preferred. I have further found that by employing at least two gram molecular equivalents of sulphuric acid of from 90 to 100 per cent concentration per gram equivalent weight of aromatic nuclei in the resin starting material (e. g. at least two moles of sulphuric acid per mole of styrene chemically combined as polystyrene) the resin films may quite rapidly be sulphonated throughout at temperatures of from 150° to 190°

C. to obtain sulphonated resin products which are white, or only slightly discolored, and which are insoluble, but highly swellable, with water. I have further found that such sulphonated resin films, which are insoluble in, but swellable by, the sulphuric acid as well as by water, are fairly strong and that by employing, as the resin starting materials, films of from 0.01 to 0.05 inch thickness, the films possess adequate strength, both before and after sulphonation, to permit handling of the same on rolls and to permit carrying out of the sulphonation reaction in a continuous manner.

I have further found that aqueous sulphuric acid of from 20 to 85 weight per cent concentration causes far less extensive swelling of the sulphonated resins than does sulphuric acid of lower or higher concentration and that after completion of the sulphonation reaction to form the insoluble, but water-swellable, sulphonated resin, the latter, or a reaction mixture comprising the same, may advantageously be treated with sufficient water to bring the unconsumed sulphuric acid, which is present, to a concentration of from 20 to 85 per cent, whereby the body of sulphonated resin is caused to shrink with resultant separation, or squeezing out, of a large part of the sulphuric acid that had been absorbed therein. The sulphuric acid may be recovered by decantation or other separation procedures, e. g. by withdrawing the sulphonated resin film from the acid liquor. The film may be pressed between rolls to squeeze a further amount of sulphuric acid therefrom. By such procedure, 40 per cent or more of the sulphuric acid in the reacted mixture may be recovered in a concentration of from 20 to 85 weight per cent. The recovered acid, although not sufficiently concentrated to warrant its re-employment in the sulphonation reaction, is suitable for a wide variety of other purposes, e. g. the production of ammonium sulphate, etc.

I have still further found that sulphuric acid accompanying the sulphonated resin products may be extracted from the latter with any of a variety of liquids which are solvents for the sulphuric acid, but are non-solvents for the sulphonated resins. The liquid extractant is preferably one having less swelling action than water alone, or concentrated sulphuric acid, on the sulphonated resin. Among the liquids which may be used as such extractants are lower fatty acids such as formic acid, acetic acid, or propionic acid; acetone; concentrated aqueous hydrochloric acid solutions, e. g. of from 30 to 38 per cent concentration; dioxane; and dialkyl ethers such as diethyl ether, methyl ethyl ether, ethyl propyl ether, diproply ether, or dibutyl ether; etc. The extractant is preferably a liquid which is substantially inert to the resin sulphonic acid and the sulphuric acid and which may be vaporized from the extract to recover the same and the sulphuric acid. Although all of the extractants just mentioned meet these requirements, acetic acid is particularly suitable and effective for the purpose and is preferred.

I have also found that the two new steps just mentioned may advantageously be employed in combination with one another to remove unconsumed sulphuric acid from a sulphonated resin product and recover the acid efficiently and in a concentration suitable for other uses. Thus, after completing the resin sulphonation reaction, the swollen sulphonated resin product, or the reaction mixture comprising the same, may be treated with sufficient water to bring the sulphuric acid to a concentration of from 20 to 85, usually from 50 to 85 and preferably from 70 to 85, per cent, whereby the sulphonated resin becomes shrunk through syneresis, and a large part of the sulphuric acid may be separated from the sulphonated resin product. The portion of the sulphuric acid which is retained in the product is then extracted therefrom with acetic acid, or other liquid adapted to the purpose. The extraction may be carried out batchwise, but is preferably conducted in a continuous manner, e. g. with countercurrent movement of the sulphonated resin through a stream, or other flow, of the extractant. The liquid extractant may then be distilled from the extract to recover the same and leave the sulphuric acid as a residue.

Any alkenyl aromatic resin, i. e. any polymer or copolymer containing in chemically combined form at least 50 per cent by weight of one or more mono-alkenyl aromatic compounds having the general formula:

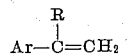

wherein Ar represents an aromatic hydrocarbon radical of the benzene series and R represents hydrogen or a methyl group, may be sulphonated by the method of the invention, but alkenyl aromatic resins which are thermoplastic are preferably employed. Examples of resins which may be sulphonated in accordance with the invention are the solid polymers of styrene, alpha-methylstyrene, ar-vinyl-toluene, ar-vinylxylene, ar-ethyl-vinylbenzene, and copolymers of any two or more of such compounds with one another or with 10 per cent by weight or less of divinylbenzene, etc.

Any of the usual sulphonating agents such as concentrated sulphuric acid, sulphur trioxide, fuming sulphuric acid, or chlorosulphonic acid may be used in the sulphonation process to obtain a sulphonated resin which either directly, or after treatment with water, occludes sulphuric acid. Sulphuric acid of from 90 to 100 per cent concentration is preferred as the sulfonating agent since it is inexpensive, readily available, and has less tendency to cause discoloration of the sulfonated resin product than do certain of the other sulphonating agents, particularly chlorosulphonic acid, when employed under otherwise similar reaction conditions. Also, the sulphonation with concentrated sulphuric acid tends to cease, or retard in rate, when the resin, e. g. polystyrene of a molding quality, is sulphonated to a desirable stage at which it remains insoluble in, but is extensively swollen by, water. The reaction can be forced, e. g. by use of excessively high temperatures, to a further stage at which the product is partially or wholly soluble in water, but sulphuric acid has less tendency than the other sulphonating agents to cause formation of the soluble sulphonated resins.

The invention will be more particularly described with reference to the sulphonation of polystyrene with concentrated sulphuric acid, it being understood that other vinyl aromatic resins can be used in place of polystyrene, and that sulphonating agents other than sulphuric acid may be used when discoloration of the product, or formation of a water-soluble sulphonated resin, is not objectionable or is desired.

In batchwise practice of the invention to produce water-insoluble, but water-swellable, polystyrene, a sheet or film of polystyrene of from 0.01 to 0.05, preferably from 0.015 to 0.03, inch thickness is immersed in sulphuric acid of from 90 to 100 per cent concentration and the latter is heated at reaction temperatures between 140° and 190° C., preferably between 150° and 180° C. until the film is sulphonated throughout. At least 2, usually 4 or more and preferably from 5 to 20 gram molecular weights of the acid are employed per mole of styrene chemically combined in the polystyrene. As the sulphonation proceeds the film decreases markedly in tensile strength and thickens, due to swelling, until it resembles a film or slab of a soft gel. The reaction occurs rapidly up to a point at which the resin is sulphonated throughout to a stage at which it is insoluble in water, but swells greatly in water, and then ceases, or continues at a lesser rate. The time required for the reaction becomes greater with increase in the film thickness, or decreases in the reaction temperature or the concentration of the sulphuric acid employed as the sulphonating agent, but usually is between 5 and 60 minutes. When the reaction is complete, a portion of the sulphonated film swells greatly, usually by 100 times its initial volume or more, on being immersed in water and no residue of unswollen film remains.

The sulphonated resin sheet, which is swollen to several times the initial thickness of the polystyrene film and occludes a considerable amount of sulphuric acid, may be freed of the latter in any of a number of ways. It may be washed with water until free of the acid, but this results in tremendous swelling of the sulphonated resin and necessitates subsequent evaporation of a large amount of water in order to recover the sulphonated product in anhydrous form. It may also be neutralized with an alkali, e. g. sodium hydroxide, or potassium hydroxide, etc., and the resin sulphonate salt be washed free of sodium sulphate with water, but this also results in extensive swelling and necessitates subsequent evaporation of a large proportion of water to recover the anhydrous resin sulphonate salt.

The sulphonated resin is more conveniently and economically freed of the occluded sulphuric acid either by: (1) treating it with sufficient water to bring the sulphuric acid to a concentration of from 20 to 85, preferably from 75 to 85, per cent of the combined weight of the sulphuric acid and water, and removing the considerable portion of the acid which exudes from the sulphonated resin due to resultant shrinkage of the latter, after which residual acid may be removed from the sulphonated resin in other ways; or (2) by extracting sulphuric acid from the sulphonated resin with acetic acid or other of the aforementioned liquid extractants; or preferably (3) by a combination of the operations (1) and (2).

Thus, the swollen sheet of freshly formed sulphonated polystyrene, which usually occludes sulphuric acid of greater than 85 per cent concentration, is advantageously treated with water in amount sufficient to form, with the sulphuric acid, an aqueous sulphuric acid solution of from 75 to 85 per cent concentration. This causes extensive shrinkage of the sulphonated resin, and a large portion, e. g. 40 per cent or more and usually from 60 to 70 per cent, of the sulphuric acid which had been occluded in the product is exuded and is separated directly from the product as aqueous sulphuric acid of from 75 to 85 per cent concentration. A further amount of sulphuric acid may be squeezed from the product, e. g. by pressing the latter between rolls.

The sulphuric acid remaining in the product is preferably extracted from the latter with acetic acid of 95 per cent concentration or above, preferably with glacial acetic acid, but the other extractants hereinbefore mentioned may be used instead. The extraction is advantageously carried out in continuous manner by passage of the sulphonated resin countercurrently through a stream of acetic acid, but it may be accomplished in other ways, e. g. batchwise, or in a Soxhlet extractor, etc. The acetic acid may be distilled from the sulphuric acid to separate and recover both acids in useable condition. The extraction, as just described, is readily carried to a point at which the sulphonated resin product is substantially free of sulphuric acid, e. g. to a point at which the product retains less than one per cent by weight of sulphuric acid. The sulphonated polystyrene product may be ground to a powder and be used directly in its acidic form, e. g. as an acid or a thickening agent. Alternatively, it may be neutralized with alkali to form its alkali metal, e. g. sodium or potassium, salts or other salts thereof.

The method may be practiced in continuous manner by causing a film or belt of polystyrene, or other alkenyl aromatic resin, to travel on supporting pulleys first through a heated bath of concentrated sulphuric acid where it is sulphonated throughout the film thickness; then from said bath and into admixture with a stream of water in amount sufficient to dilute the sulphuric acid content of the sulphonated film to a concentration of from 75 to 85 per cent, whereby the film is caused to shrink and a considerable part of the occluded sulphuric acid is exuded, or extracted, therefrom; and next from the stream of water and into, and preferably countercurrent to, a stream of concentrated or anhydrous acetic acid, or other of the extractants hereinbefore mentioned, whereby all, or nearly all, of the residual sulphuric acid is extracted from the sulphonated resin film. The film may be passed from the stream of extractant into a heating zone where it is heated, preferably under vacuum, to vaporize occluded extractant therefrom, or it may be rendered free of the extractant in other ways, e. g. by washing with water, etc. If desired, the film may be passed through a stream of an alkali, e. g. a stream of an aqueous sodium or potassium hydroxide solution, to convert the sulphonated polystyrene to a salt thereof and the salt be dried, preferably by heating under vacuum.

During lengthwise travel of the belt or sheet of film through such series of operations, sulphuric acid may be fed to and withdrawn from the sulphonation bath, and the other treating liquids may similarly be fed to and withdrawn from their respective zones for treatment of the film, as necessary for continuous operation. Also, the extract obtained in the operation of extracting sulphuric acid from the sulphonated polystyrene film, e. g. with concentrated acetic acid, may be heated to distill and recover the extractant therefrom leaving the extracted sulphuric acid in useable form as a residue.

In place of polystyrene, films of other alkenyl aromatic resins such as the solid polymers of alpha-methylstyrene, or ar-vinyl-toluene, or copolymers of such alkenyl aromatic hydrocarbons with one another or with other alkenyl aromatic compounds, e. g. copolymers of styrene with minor amounts of alkenyl aromatic compounds such as ar-chlorostyrene or divinylbenzene, may be sulphonated throughout and the sulphonated polymers, or salts thereof, be recovered by either the batchwise or the continuous modes of operation just described.

The following examples describe ways for practice of the invention and illustrate certain of its advantages, but are not to be construed as limiting the invention.

Example 1

A polystyrene disk, 4 inches in diameter and of 0.021 inch thickness, was immersed in 150 milliliters of sulphuric acid of approximately 98 per cent concentration. The acid, with the disk immersed therein, was heated in an oven at 150° C. for 40 minutes. The polystyrene of which the disk was composed was of a molding quality, i. e. its molecular weight, although not measured, was known to be in the order of from 70,000 to 150,000 as determined by the Staudinger viscosity method. After the 40 minutes of heating in the oven, sulphuric acid was decanted from the disk and the latter was washed with water until the water in contact therewith was of a pH value between 3 and 4. The sulphonated polystyrene, which was swollen by the water to a gel-like plate or slab, was treated with a one-normal aqueous sodium hydroxide solution in amount sufficient to bring the liquor in contact with the product to a pH value of between 8 and 9. The swollen slab of the resultant sodium salt of the sulphonated polystyrene was washed with distilled water and dried in an oven at from 60° to 70° C. During drying, it shrunk to a relatively thin, pale-yellow sheet. The latter was ground to a powder which was white.

Example 2

The procedure of Example 1 was repeated, except that the steps of neutralizing the sulphonated polystyrene with sodium hydroxide to convert it to the sodium salt and washing the latter were omitted. Sulphonated polystyrene in its free, or acidic, form was obtained as a white powder.

Example 3

This example describes the results obtained in sulphonating granular polystyrene, and is presented for purpose of comparison with the foregoing Examples 1 and 2. Polystyrene granules, in the form of short rods of $\frac{1}{8}$ inch diameter and from $\frac{1}{8}$ to $\frac{1}{2}$ inch length, were immersed in sulphuric acid of approximately 98 per cent concentration and the mixture was heated at 150° C. Approximately two hours of heating was required to sulphonate the granules throughout. Sulphuric acid was decanted from the product. The product, which was of dark color, was washed with water, neutralized with sodium hydroxide, again washed with water, dried, and ground to a powder. The powdered sodium salt of sulphonated polystyrene, thus obtained, was of from dark gray to brown color. The reason for the $\frac{1}{8}$ inch diameter granules of polystyrene darkening during sulphonation at 150° C., whereas the relatively thin sheets of polymer required by the invention do not darken appreciably during sulphonation at the same oven temperature, is not known with certainty. However, it is known that polystyrene is a poor conductor of heat and it is believed that heat generated inside the individual polystyrene granules during sulphonation remains largely trapped therein with a result that reaction temperature inside the granules becomes considerably higher than that of the acid surrounding the granules and a limited amount of charring, or other decomposition of the polymer, results. Because of their thinness, the polymer sheets employed in the invention permit dissipation of heat generated by the sulphonation reaction.

Example 4

Polystyrene film of 0.02 inch thickness was immersed in sulphuric acid of 95 per cent concentration. Approximately 34.4 molecular equivalents of sulphuric acid was employed per mole of styrene chemically combined as the polystyrene. The mixture was heated at temperatures of from 165° to 175° C. for 40 minutes, the acid having been preheated to approach said temperatures prior to immersion of the film therein. After the 40 minutes of heating, sulphuric acid was drained from the sulphonated polystyrene and the latter was washed thoroughly with water. The sulphonated polystyrene was next neutralized with aqueous sodium hydroxide to convert it to its sodium salt, washed with water, dried in a current of air at 80° C. and ground to a powder. The powdered sodium salt of sulphonated polystyrene was light-gray, i. e. nearly white. It had a bulk density of 1.4 at room temperature and contained 7.26 per cent by weight of chemically combined sodium. Its content of sodium indicated the presence of approximately 7.2 sulphonate radicals per 10 aromatic nuclei of the product. Upon treatment with water until swelling ceases, it was found that the sodium salt of the sulphonated polystyrene swelled to approximately 150 times its initial volume. The thickening action of the dry powdered product was determined by stirring measured amounts of the same into separate portions of water, or of sulphuric acid of 95 per cent concentration, and measuring the viscosity of the resultant dispersions. The following table names the liquid medium employed in each such test, gives the per cent by weight of the powdered product dispersed in the medium, and indicates the viscosity in centistokes at 25° C. of the resultant dispersions.

TABLE I

| Test No. | Medium | Percent of Product in Dispersion | Viscosity |
|---|---|---|---|
| 1 | $H_2O$ | 2 | 378 |
| 2 | $H_2O$ | 5 | 30,000 |
| 3 | $H_2O$ | 10 | 4,000,000 |
| 4 | $H_2SO_4$ | 3 | 16,000 |
| 5 | $H_2SO_4$ | 5 | 1,200,000 |

Example 5

This example illustrates the effect of varying conditions of temperature and sulphuric acid concentration on the rate and extent of the reaction for the sulphonation of thin films of polystyrene. In each of a series of experiments, a polystyrene disk of 0.021 inch thickness and weighing one gram was immersed in sulphuric acid of the concentration indicated in the following table, which acid had been preheated to approach the reaction temperatures also given. The preheating was for purpose of permitting fairly accurate measurement of the conditions of time and temperature for the reaction. In each experiment 200 molecular equivalents of sulphuric acid was employed per mole of styrene chemically combined as the polystyrene. The reason for employment of such a large excess of the acid was to render negligible the diluting effect of water formed in the sulphonation reaction. Each mixture of sulphuric acid and a polystyrene disk was heated at the temperature and for the time given in the table. The disk was then removed from the acid and weighed. It may be mentioned that during sulphonation with sulphuric acid, a body of polystyrene swells and absorbs acid. The resultant increase in weight of the body varies in accordance with the extent of the sulphonation reaction and serves as an indirect measurement of the extent of the reaction. Table II indicates the concentration of the sulphuric acid which was used as a starting material in each experiment, gives the temperature and time of reaction, and gives the weight of the swollen sulphonated polystyrene product. In instances in which the polystyrene was sulphonated to such great extent that it dissolved in, rather than merely being swelled by, the sulphuric acid, this fact is indicated.

TABLE II

| Run No. | Reaction Conditions | | | Weight of Swelled Product Gms. |
|---|---|---|---|---|
| | $H_2SO_4$ Conc. Percent | Time Min. | Temp. C. | |
| 1 | 90.5 | 5 | 165–167 | 2.5 |
| 2 | 90.5 | 10 | 165–167 | 5.0 |
| 3 | 90.5 | 20 | 165–167 | 6.7 |
| 4 | 90.5 | 30 | 165–167 | 9.0 |
| 5 | 90.5 | 35 | 165–167 | 19.0 |
| 6 | 90.5 | 38 | 165–167 | 28.0 |
| 7 | 90.5 | 50 | 165–167 | 34.0 |
| 8 | 90.5 | 5 | 190 | 10.2 |
| 9 | 90.5 | 10 | 190 | 26.2 |
| 10 | 90.5 | 15 | 190 | 37.5 |
| 11 | 90.5 | 20 | 190 | 41.5 |
| 12 | 90.5 | 25 | 190 | 53.7 |
| 13 | 90.5 | 30 | 190 | 89.0 |
| 14 | 95 | 10 | 150 | 4.0 |
| 15 | 95 | 20 | 150 | 7.2 |
| 16 | 95 | 25 | 150 | 11.6 |
| 17 | 95 | 30 | 150 | 18.5 |
| 18 | 95 | 40 | 150 | 27.1 |
| 19 | 95 | 50 | 150 | 27.2 |
| 20 | 95 | 5 | 165–167 | 5.5 |
| 21 | 95 | 10 | 165–167 | 13.5 |
| 22 | 95 | 15 | 165–167 | 29.5 |
| 23 | 95 | 20 | 165–167 | 36.5 |
| 24 | 95 | 25 | 165–167 | 45.6 |
| 25 | 95 | 30 | 165–167 | 57.5 |
| 26 | 95 | 35 | 165–167 | 63.5 |
| 27 | 95 | 40 | 165–167 | 64.2 |
| 28 | 95 | 50 | 165–167 | 64.5 |
| 29 | 95 | 5 | 190 | 35.0 |
| 30 | 95 | 10 | 190 | 50.0 |
| 31 | 95 | 15 | 190 | 72.5 |
| 32 | 95 | 25 | 190 | Soluble |
| 33 | 99 | 5 | 150 | 4.0 |
| 34 | 99 | 25 | 150 | 14.0 |
| 35 | 99 | 30 | 150 | 26.0 |
| 36 | 99 | 35 | 150 | 36.5 |
| 37 | 99 | 45 | 150 | 46.0 |
| 38 | 99 | 60 | 150 | 57.2 |
| 39 | 99 | 5 | 170 | 12.5 |
| 40 | 99 | 10 | 170 | 30.5 |
| 41 | 99 | 15 | 170 | 43.0 |
| 42 | 99 | 20 | 170 | 50.0 |
| 43 | 99 | 25 | 170 | 61.6 |
| 44 | 99 | 30 | 170 | 72.3 |
| 45 | 99 | 5 | 190 | 30.5 |

Runs 1–7 and 14–28 show that when using reaction temperatures of 167° C. or lower and sulphuric acid having an initial concentration of 95 per cent or lower, the sulphonation reaction ceases or becomes sluggish at a stage at which the sulphonated styrene is swollen by the acid, but remains insoluble in the acid. This same tendency for the reaction to retard in rate when the sulphonation has reached such stage is evident, but not nearly so pronounced, in the other series of runs of the table wherein sulphuric acid of 99 per cent concentration, or a reaction temperature of 190° C. were employed. When using such highly concentrated sulphuric acid, or such high reaction temperature, the reaction may be continued at a fairly rapid rate to a stage at which the sulphonated polymer is soluble in the acid.

*Example 7*

This example illustrates the extent to which a sulphonated polystyrene in its acidic form is swelled by aqueous sulphuric acid solutions of various concentrations. In each of a series of tests, one milliliter of a dry, powdered sulphonic acid of polystyrene, which had been prepared substantially as described in Example 2 and which was swellable, but insoluble, in water, was immersed in a greater amount of aqueous sulphuric acid than could be absorbed thereby, and the mixture was permitted to stand at room temperature until swelling of the sulphonated polymer was substantially complete. The volume of the swollen sulphonated polystyrene was then measured. The concentration of the sulphuric acid used as a swelling agent was varied from one experiment to another. Table III gives the per cent concentration of the sulphuric acid employed in each experiment and the volume of the swollen sulphonated polystprene.

TABLE III

| Test No. | $H_2SO_4$ Conc. Percent | Volume of Swollen Product ml. |
|---|---|---|
| 1 | 10 | 12.0 |
| 2 | 20 | 4.3 |
| 3 | 30 | 2.1 |
| 4 | 40 | 1.6 |
| 5 | 50 | 1.7 |
| 6 | 60 | 1.5 |
| 7 | 70 | 2.5 |
| 8 | 80 | 2.4 |
| 9 | 90 | 10.8 |

From the table, it will be seen that swelling of the product is low when the aqueous sulphuric acid contacted therewith is of from 20 to 80 per cent concentration, but that the extent of swelling increases sharply when the sulphuric acid is increased above, or decreases below, the range of concentrations just stated.

*Example 8*

This example illustrates the removal by syneresis of a large portion of the sulphuric acid from sulphonated polystyrene which had been swollen with the acid. In order to be certain as to the quantities of materials employed, 5 grams of powdered sulphonated polystyrene in its acidic form was swelled by contact with, and absorption of, 41.2 grams of sulphuric acid of 98 per cent concentration. Water was added gradually, and with cooling, until syneresis occurred. The free sulphuric acid which exuded during shrinkage of the sulphonated polystyrene was decanted. A further amount of sulphuric acid was squeezed from the sulphonated polymer in a mortar. The aqueous sulphuric acid recovered by these operations was of approximately 70 per cent concentration. It contained 87.4 per cent of the sulphuric acid initially employed.

In another experiment a swollen body of sulphonated polystyrene, produced by the sulphonation of polystyrene with concentrated sulphuric acid, was treated with water in amount sufficient to cause syneresis, and the sulphuric acid, which exuded due to shrinkage of the product, was decanted from the latter. The recovered sulphuric acid was of 80 per cent concentration.

*Example 9*

In each of a series of experiments, a portion of sulphonated polystyrene, which was swollen with sulphuric acid and which contained 13 per cent by weight of sulphuric acid of from 70 to 80 per cent concentration, was extracted with a single portion of a solvent for sulphuric acid. The amount of aqueous sulphuric acid contained in the extract was determined. Table IV names and gives the volume in milliliters of the extractant employed in each experiment. It also gives the grams of swollen sulphonated polystyrene subjected to each extraction and the grams of $H_2SO_4$ found in the extract. In the table, sulphonated polystyrene is abbreviated as "S.P.S.".

TABLE IV

| Test No. | Extractant | | Swollen S.P.S. gms. | $H_2SO_4$ Extracted gms. |
|---|---|---|---|---|
| | Kind | Volume ml. | | |
| 1 | Glacial Acetic Acid | 200 | 50 | 5.37 |
| 2 | Acetone | 200 | 50 | 4.36 |
| 3 | 36% Aqueous HCl Sol'n | 200 | 50 | 3.04 |
| 4 | Dioxane | 200 | 50 | 1.76 |
| 5 | Diethyl Ether | 150 | 20 | 2.01 |

*Example 10*

This example illustrates the effectiveness of acetic acid in extracting sulphuric acid from an acid-swollen body of sulphonated polystyrene. The material which was subjected to the extraction was a body of sulphonated polystyrene which had been prepared by reacting concentrated sulphuric acid with polystyrene and which was swollen with excess sulphuric acid employed in the sulphonation reaction. Prior to the extraction, the swollen sulphonated polystyrene had been stored at room temperature for about 3 months. During storage, it had absorbed moisture from the air, thereby diluting considerably the sulphuric acid in the swollen body and exuding part of the sulphuric acid which it contained when first formed. A 17.487 gram sample of the swollen sulphonated polystyrene was subjected to a series of single extractions with fresh 100 ml. portions of glacial acetic acid. The amount of sulphuric acid present in each extract was determined by analysis. The sulphonated polystyrene remaining after the last of the series of extractions was heated under vacuum to remove all acetic acid therefrom. It then weighed 9.5389 grams. It was next washed thoroughly to remove any remaining sulphuric acid by dispersing the same as fine particles in 3 liters of water and filtering the mixture. The sulphuric acid content of the filtrate (and therefore of the sulphonated polystyrene after the extractions with acetic acid) was determined by analysis. From the several analyses, it was found that the 17.487 grams of swollen sulphonated polystyrene starting material consisted of approximately 9.4705 grams of sulphonated polystyrene, 3.6994 grams of $H_2SO_4$, and 4.3171 grams of water, the sulphuric acid and water being in proportions corresponding to an aqueous sulphuric acid solution of about 46.1 per cent concentration. Table V gives the volume of extract obtained in each of the successive extractions with a fresh 100 ml. portion of glacial acetic acid and the amount of $H_2SO_4$ found in the extract. It also gives the amount of $H_2SO_4$ found in the sulphonated polystyrene after completion of the series of successive extractions with acetic acid. In the table, the sulphonated polystyrene remaining after the acetic acid extractions is referred to as a "residue."

TABLE V

| Extraction No. | Volume of Extract, ml. | $H_2SO_4$ Content gms. |
|---|---|---|
| 1 | 88.0 | 1.152 |
| 2 | 92.5 | 0.887 |
| 3 | 94.2 | 0.414 |
| 4 | 84.0 | 0.630 |
| 5 | 94.0 | 0.244 |
| 6 | 93.7 | 0.122 |
| 7 | 95.5 | 0.124 |
| 8 | 97.0 | 0.029 |
| 9 | 97.0 | 0.029 |
| Residue | | 0.0684 |

Approximately 98.3 per cent of the sulphuric acid initially present in the swollen sulphonated polystyrene body was removed by the extractions with acetic acid. After said extractions, the sulphonated polystyrene retained only 0.72 per cent of $H_2SO_4$, based on the combined weight of the sulphonated polystyrene and the residual $H_2SO_4$.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. A method of making a sulphonated polymer of an alkenyl aromatic resin which comprises immersing the resin, in the form of a film of from 0.01 to 0.05 inch thickness, in sulphuric acid of from 90 to 100 per cent concentration, heating the mixture at temperatures between 140° and 200° C. until the resin is sulphonated throughout to a sulphuric acid-swollen sulphonated resin which remains insoluble upon immersion in water, said time of heating being between 5 and 60 minutes, treating the sulphuric acid-swollen sulphonated resin with water in the amount required to form with the sulphuric acid an aqueous sulphuric acid solution having a concentration of between 20 and 85 per cent by weight, whereby the sulphonated resin body is caused to shrink and exude a considerable part of the sulphuric acid with which it was swollen, removing exuded sulphuric acid from the sulphonated resin body, extracting residual sulphuric acid from the latter with a liquid extractant of the group consisting of saturated aliphatic monocarboxylic acids having from 1 to 3 carbon atoms in the molecule, acetone, a concentrated aqueous hydrochloric acid solution, dioxane and dialkyl ethers having from 4 to 6 carbon atoms in the molecule, and vaporizing residual extractant from the sulphonated resin.

2. A method, as described in claim 1, wherein the alkenyl aromatic resin is polystyrene.

3. A method, as described in claim 1, wherein the liquid extractant is acetic acid.

4. A method, as described in claim 1, wherein the sulphuric acid-swollen film is treated with water in amount sufficient to dilute the sulphuric acid to an aqueous sulphuric acid solution of from 75 to 85 per cent concentration.

5. A method, as described in claim 1, wherein the film of the alkenyl aromatic resin is sulphonated in continuous manner by endwise movement through a bath of the heated sulphuric acid while at the same time adding and withdrawing sulphuric acid from the bath, passing the resultant sulphuric acid-swollen sulphonated resin film from said zone through a zone wherein it is treated with water in amount sufficient to dilute its content of sulphuric acid to an aqueous sulphuric acid solution of from 75 to 85 concentration, whereby the sulphonated resin body is caused to shrink and exude part of the sulphuric acid occluded therein, passing the sulphonated film from said zone to another zone where it travels into contact with and counter to the flow of a stream of the extractant, whereby residual sulphuric acid is extracted from the sulphonated resin, and passing the sulphonated resin film from the last-mentioned zone through a heating zone where occluded extractant is vaporized therefrom, the movement of the film through the above-stated steps and stages being continuous.

6. A method, as described in claim 5, wherein the alkenyl aromatic resin is polystyrene.

7. A method, as described in claim 5, wherein the extractant is acetic acid.

8. In a method of sulphonating an alkenyl aromatic resin, the steps of immersing a film of the resin, which film is of from 0.01 to 0.05 inch thickness, in sulphuric acid of from 90 to 100 per cent concentration and heating the mixture at reaction temperatures between 150° and 190° C. for from 5 to 60 minutes, whereby the resin film is sulphonated throughout with formation of a light colored to white sulphonated resin.

9. A method of sulphonating solid polystyrene which comprises immersing a polystyrene film, of from 0.01 to 0.05 inch thickness, in sulphuric acid of from 90 to 96 per cent concentration, at least 4 molecular equivalents of sulphuric acid being present per mole of styrene chemically combined in the polystyrene and heating the mixture at temperatures between 150° and 190° C. for from 5 to 60 minutes, whereby the polystyrene film is sulphonated throughout with formation of light colored to white sulphonated polystyrene.

10. A continuous method for sulphonating an alkenyl aromatic resin which comprises passing a film of the resin, said film being of from 0.01 to 0.05 inch thickness, endwise through a bath of sulphuric acid, of from 90 to 100 per cent concentration and heated at temperatures between 150° and 190° C., at a rate of travel such that a point on the film passes through and from the bath in from 5 to 60 minutes, whereby the resin film is sulphonated throughout with formation of a light colored to white sulphonated resin product.

11. A method, as described in claim 9, wherein the resin film is heated together with the sulphuric acid at reaction temperatures between 150° and 190° C. for from 5 to 60 minutes, and discontinuing the heating at such temperatures while the film remains undissolved in the sulphuric acid.

12. A method, as described in claim 10, wherein the alkenyl aromatic resin is polystyrene, the rate of travel of the polystyrene film is such that a point on the film passes through the heated sulphuric acid bath in from 5 to 60 minutes and from said bath while the film remains substantially undissolved by the sulphuric acid, whereby the polystyrene is sulphonated throughout, without undergoing serious discoloration, to a stage at which it is swellable by, but substantially insoluble in, water.

13. In a method wherein a sulphuric acid-swollen body of a sulphonated alkenyl aromatic resin is formed by reaction of a sulphonating agent with a vinyl aromatic resin, the steps of treating the sulphuric acid-swollen sulphonated resin with water in amount sufficient acid solution of from 75 to 85 per cent concentration, whereby the swollen sulphonated resin body is caused to shrink and exude sulphuric acid, and removing exuded sulphuric acid from the body of sulphonated resin.

14. A method, as described in claim 13, wherein the alkenyl aromatic resin is polystyrene and the sulphonated alkenyl aromatic resin is sulphonated polystyrene.

15. In a method wherein a sulphuric acid-swollen body of a sulphonated alkenyl aromatic resin is formed by reacting a sulphonating agent with an alkenyl aromatic resin, the step of extracting sulphuric acid from the swollen body with a liquid extractant of the group consisting of saturated aliphatic monocarboxylic acids having from 1 to 3 carbon atoms in the molecule, acetone, a concentrated aqueous hydrochloric acid solution, dioxane, and a dialkyl ether having from 4 to 6 carbon atoms in the molecule.

16. In a method wherein a sulphuric acid-swollen body of polystyrene is formed by reacting sulphuric acid with polystyrene, the steps of extracting sulphuric acid from the swollen body with concentrated acetic acid and thereafter vaporizing residual acetic acid from the sulphonated polystyrene.

HAROLD H. ROTH.

REFERENCES CITED

The following references are of record in the file of this patent:

UNITED STATES PATENTS

| Number | Name | Date |
|---|---|---|
| 2,400,720 | Staudinger | May 21, 1946 |
| 2,446,536 | Hardy | Aug. 10, 1948 |